US010609267B2

(12) United States Patent
Wexler et al.

(10) Patent No.: US 10,609,267 B2
(45) Date of Patent: Mar. 31, 2020

(54) SYSTEMS AND METHODS FOR ANALYZING ADVERTISEMENT EFFECTIVENESS USING WEARABLE CAMERA SYSTEMS

(71) Applicant: OrCam Technologies, Ltd., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

(*) Notice: Subject to any disclaimer, the term of this patent is extended or adjusted under 35 U.S.C. 154(b) by 766 days.

(21) Appl. No.: 14/807,392

(22) Filed: Jul. 23, 2015

(65) Prior Publication Data
US 2016/0025972 A1    Jan. 28, 2016

Related U.S. Application Data

(60) Provisional application No. 62/027,936, filed on Jul. 23, 2014, provisional application No. 62/027,957, filed on Jul. 23, 2014.

(51) Int. Cl.
*G06Q 30/02* (2012.01)
*H04N 5/225* (2006.01)
(Continued)

(52) U.S. Cl.
CPC ......... *H04N 5/2259* (2013.01); *G01S 3/7864* (2013.01); *G02B 27/0093* (2013.01);
(Continued)

(58) Field of Classification Search
CPC .................. H04N 5/2259; G06Q 30/0246
See application file for complete search history.

(56) References Cited

U.S. PATENT DOCUMENTS

| 2015/0062160 A1* | 3/2015 | Sakamoto | ............ H04N 17/002 345/633 |
| 2015/0073907 A1* | 3/2015 | Purves | ................... G06Q 20/32 705/14.58 |

(Continued)

OTHER PUBLICATIONS

"Google Glass, Augmented Reality, and the Future of Shopping", by Shawn Graham. Apr. 5, 2012. (Year: 2012).*
(Continued)

*Primary Examiner* — William A Brandenburg
(74) *Attorney, Agent, or Firm* — Finnegan, Henderson, Farabow, Garrett & Dunner, LLP

(57) ABSTRACT

Systems are provided for analyzing the effectiveness of an advertisement using information provided by a wearable camera system. In one implementation, a system includes a memory storing executable instructions, and at least one processing device programmed to execute the instructions to receive, from the wearable camera system, information derived from image data related to an advertisement in an environment of a user of the wearable camera system. The processing device of the system may be further configured to receive information derived from the image data related to activities of the user, and may be configured to identify, based on this received information, a product acquired by the user that is associated with the advertisement.

53 Claims, 16 Drawing Sheets

(51) Int. Cl.

| | | |
|---|---|---|
| G06F 1/18 | (2006.01) | |
| G06F 16/532 | (2019.01) | |
| G06T 7/00 | (2017.01) | |
| G06T 7/73 | (2017.01) | |
| G06K 9/62 | (2006.01) | |
| G06F 1/16 | (2006.01) | |
| G06F 3/03 | (2006.01) | |
| G02B 27/00 | (2006.01) | |
| G02B 27/01 | (2006.01) | |
| G06F 3/01 | (2006.01) | |
| H04N 5/232 | (2006.01) | |
| H04N 7/18 | (2006.01) | |
| G06F 3/00 | (2006.01) | |
| G06F 3/038 | (2013.01) | |
| H04N 5/235 | (2006.01) | |
| G06K 9/00 | (2006.01) | |
| G06T 7/20 | (2017.01) | |
| H04N 5/44 | (2011.01) | |
| G01S 3/786 | (2006.01) | |
| H04N 1/21 | (2006.01) | |
| G06F 16/53 | (2019.01) | |
| G06F 16/51 | (2019.01) | |

(52) U.S. Cl.
CPC ........... *G02B 27/017* (2013.01); *G06F 1/163* (2013.01); *G06F 1/1686* (2013.01); *G06F 1/18* (2013.01); *G06F 1/188* (2013.01); *G06F 3/005* (2013.01); *G06F 3/011* (2013.01); *G06F 3/012* (2013.01); *G06F 3/017* (2013.01); *G06F 3/0304* (2013.01); *G06F 3/038* (2013.01); *G06F 16/51* (2019.01); *G06F 16/53* (2019.01); *G06F 16/532* (2019.01); *G06K 9/00201* (2013.01); *G06K 9/00208* (2013.01); *G06K 9/00221* (2013.01); *G06K 9/00288* (2013.01); *G06K 9/00335* (2013.01); *G06K 9/00624* (2013.01); *G06K 9/00671* (2013.01); *G06K 9/00677* (2013.01); *G06K 9/00718* (2013.01); *G06K 9/6262* (2013.01); *G06Q 30/0246* (2013.01); *G06Q 30/0257* (2013.01); *G06Q 30/0267* (2013.01); *G06Q 30/0269* (2013.01); *G06T 7/20* (2013.01); *G06T 7/74* (2017.01); *G06T 7/97* (2017.01); *H04N 1/2112* (2013.01); *H04N 5/2251* (2013.01); *H04N 5/2252* (2013.01); *H04N 5/2254* (2013.01); *H04N 5/2257* (2013.01); *H04N 5/2258* (2013.01); *H04N 5/2353* (2013.01); *H04N 5/23206* (2013.01); *H04N 5/23216* (2013.01); *H04N 5/23219* (2013.01); *H04N 5/23229* (2013.01); *H04N 5/23245* (2013.01); *H04N 5/23258* (2013.01); *H04N 5/44* (2013.01); *H04N 7/183* (2013.01); *H04N 7/185* (2013.01); *G02B 2027/014* (2013.01); *G02B 2027/0138* (2013.01); *G02B 2027/0178* (2013.01); *G02B 2027/0187* (2013.01); *G06F 2203/011* (2013.01); *G06K 2209/21* (2013.01); *G06K 2209/25* (2013.01); *G06T 2207/10004* (2013.01); *G06T 2207/10016* (2013.01); *G06T 2207/30232* (2013.01)

(56) References Cited

U.S. PATENT DOCUMENTS

| | | | | |
|---|---|---|---|---|
| 2015/0088637 | A1* | 3/2015 | Muguchi | G06Q 30/0246 705/14.45 |
| 2016/0026253 | A1* | 1/2016 | Bradski | G02B 27/225 345/8 |

OTHER PUBLICATIONS

"4 Ways Wearable Tech Could Change Your Marketing Strategy", by Erin Rodat-Silva. Jul. 13, 2014. (Year: 2014).*

* cited by examiner

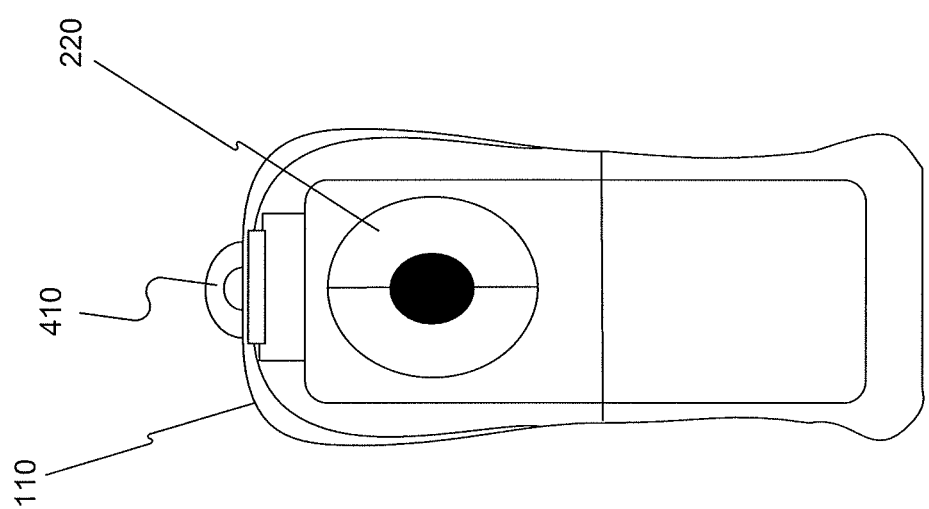

SYSTEMS AND METHODS FOR ANALYZING ADVERTISEMENT EFFECTIVENESS USING WEARABLE CAMERA SYSTEMS

CROSS REFERENCES TO RELATED APPLICATIONS

This application claims the benefit of priority of U.S. Provisional Patent Application No. 62/027,936, filed on Jul. 23, 2014, and U.S. Provisional Patent Application No. 62/027,957, filed on Jul. 23, 2014, all of which are incorporated herein by reference in their entirety.

BACKGROUND

I. Technical Field

This disclosure generally relates to devices and methods for capturing and processing images from an environment of a user. More particularly, this disclosure relates to devices and methods for analyzing advertisement effectiveness using wearable camera systems via the "crowd sourcing" of quantified self-information.

II. Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment. Therefore, there is a need for apparatuses and methods for automatically capturing and processing images in a manner that provides useful information to users of the apparatuses.

SUMMARY

Embodiments consistent with the present disclosure provide systems for analyzing advertisement effectiveness using information provided by a wearable camera system.

In accordance with a disclosed embodiment, a system is provided for analyzing advertisement effectiveness using information provided by a wearable camera system. The system may comprise a memory storing executable instructions, and at least one processing device programmed to execute the instructions. The processor device may be configured to receive, from the wearable camera system, information derived from image data captured by the wearable camera system related to one or more occurrences of an advertisement in an environment of a user of the wearable camera system. Further, the processor device may be configured to receive, from the wearable camera system, information derived from the image data captured by the wearable camera system related to one or more activities of the user. Also, the processor device may be configured to identify, based on the information related to the one or more occurrences of the advertisement and the information related to the one or more activities of the user, a product acquired by the user that is associated with the advertisement.

In accordance with another disclosed embodiment, a system is provided for analyzing advertisement effectiveness. The system may comprise a memory storing executable instructions, and at least one processing device programmed to execute the instructions. The processor device may be configured to receive, from a plurality of wearable camera systems, information related to one or more occurrences of an advertisement in environments of users of the wearable camera systems. The processor device may be further configured to receive, from the plurality of wearable camera systems, information associated with image data captured by the wearable camera systems. Additionally, the processor device may be configured to analyze the information to identify one or more of the users of the plurality of wearable camera systems who purchased a product included in the advertisement. The processor device may be configured to determine, based on the analysis, an effectiveness of the advertisement.

In accordance with yet another disclosed embodiment, a system is provided for analyzing advertisement effectiveness. The system may comprise a memory storing executable instructions, and at least one processing device programmed to execute the instructions. The processor device may be configured to receive, from a plurality of wearable camera systems, information related to one or more occurrences of an advertisement in environments of users of the wearable camera systems. The processor device may be configured to receive, from the plurality of wearable camera systems, information related to purchases made by the users of the wearable camera systems. Additionally, the processor device may be further configured to determine, based on the information related to the one or more occurrences of the advertisement and the information related to the purchases made by the users of the wearable camera systems, statistics on the users who viewed the advertisement and purchased a product associated with the advertisement.

In accordance with still another disclosed embodiment, a system is provided for analyzing advertisement effectiveness. The system may comprise a memory storing executable instructions, and at least one processing device programmed to execute the instructions. The processor device may be configured to receive, from a plurality of wearable camera systems, information related to one or more occurrences of an advertisement in environments of users of the wearable camera systems. The processor device may be further configured to determine, based on the information related to the one or more occurrences of the advertisement, statistics on the users who viewed the advertisement.

In accordance with another disclosed embodiment, a system is provided for analyzing advertisement effectiveness. The system may comprise a memory storing executable instructions, and at least one processing device programmed to execute the instructions. The processor device may be configured to receive, from a plurality of wearable camera systems, information related to purchases made by the users of the wearable camera systems. Additionally, the processor device may be further configured to determine, based on the information related to the purchases made by the users of the wearable camera systems, statistics on the users who purchased a product.

In accordance with still another disclosed embodiment, a software product stored on a non-transitory computer readable medium is provided. The software product may comprise data and computer implementable instructions for carrying out a method. The method comprises receiving, from the wearable camera system, information derived from image data captured by the wearable camera system related to one or more occurrences of an advertisement in an environment of a user of the wearable camera system. Further, the method comprises receiving, from the wearable camera system, information derived from the image data captured by the wearable camera system related to one or more activities of the user. Also, the method comprises identifying, based on the information related to the one or more occurrences of the advertisement and the information related to the one or more activities of the user, a product acquired by the user that is associated with the advertisement.

In accordance with still another disclosed embodiment, a software product stored on a non-transitory computer readable medium is provided. The software product may comprise data and computer implementable instructions for carrying out a method. The method comprises receiving, from a plurality of wearable camera systems, information related to one or more occurrences of an advertisement in environments of users of the wearable camera systems. The method also comprises receiving, from the plurality of wearable camera systems, information associated with image data captured by the wearable camera systems, and analyzing the information to identify one or more of the users of the plurality of wearable camera systems who purchased a product included in the advertisement. The method further comprises determining, based on the analysis, an effectiveness of the advertisement.

In accordance with yet another disclosed embodiment, a software product stored on a non-transitory computer readable medium is provided. The software product may comprise data and computer implementable instructions for carrying out a method. The method comprises receiving, from a plurality of wearable camera systems, information related to one or more occurrences of an advertisement in environments of users of the wearable camera systems. The method further comprises receiving, from the plurality of wearable camera systems, information related to purchases made by the users of the wearable camera systems. Additionally, the method comprises determining, based on the information related to the one or more occurrences of the advertisement and the information related to the purchases made by the users of the wearable camera systems, statistics on the users who viewed the advertisement and purchased a product associated with the advertisement.

In accordance with another disclosed embodiment, a software product stored on a non-transitory computer readable medium is provided. The software product may comprise data and computer implementable instructions for carrying out a method. The method comprises receiving, from a plurality of wearable camera systems, information related to one or more occurrences of an advertisement in environments of users of the wearable camera systems. The method further comprises determining, based on the information related to the one or more occurrences of the advertisement, statistics on the users who viewed the advertisement.

In accordance with still another disclosed embodiment, a software product stored on a non-transitory computer readable medium is provided. The software product may comprise data and computer implementable instructions for carrying out a method. The method comprises receiving, from a plurality of wearable camera systems, information related to purchases made by the users of the wearable camera systems. Additionally, the method further comprises determining, based on the information related to the purchases made by the users of the wearable camera systems, statistics on the users who purchased a product.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 4A is a schematic illustration of an example of the wearable apparatus shown in FIG. 1B from a first viewpoint.

DETAILED DESCRIPTION

Figure 1A:
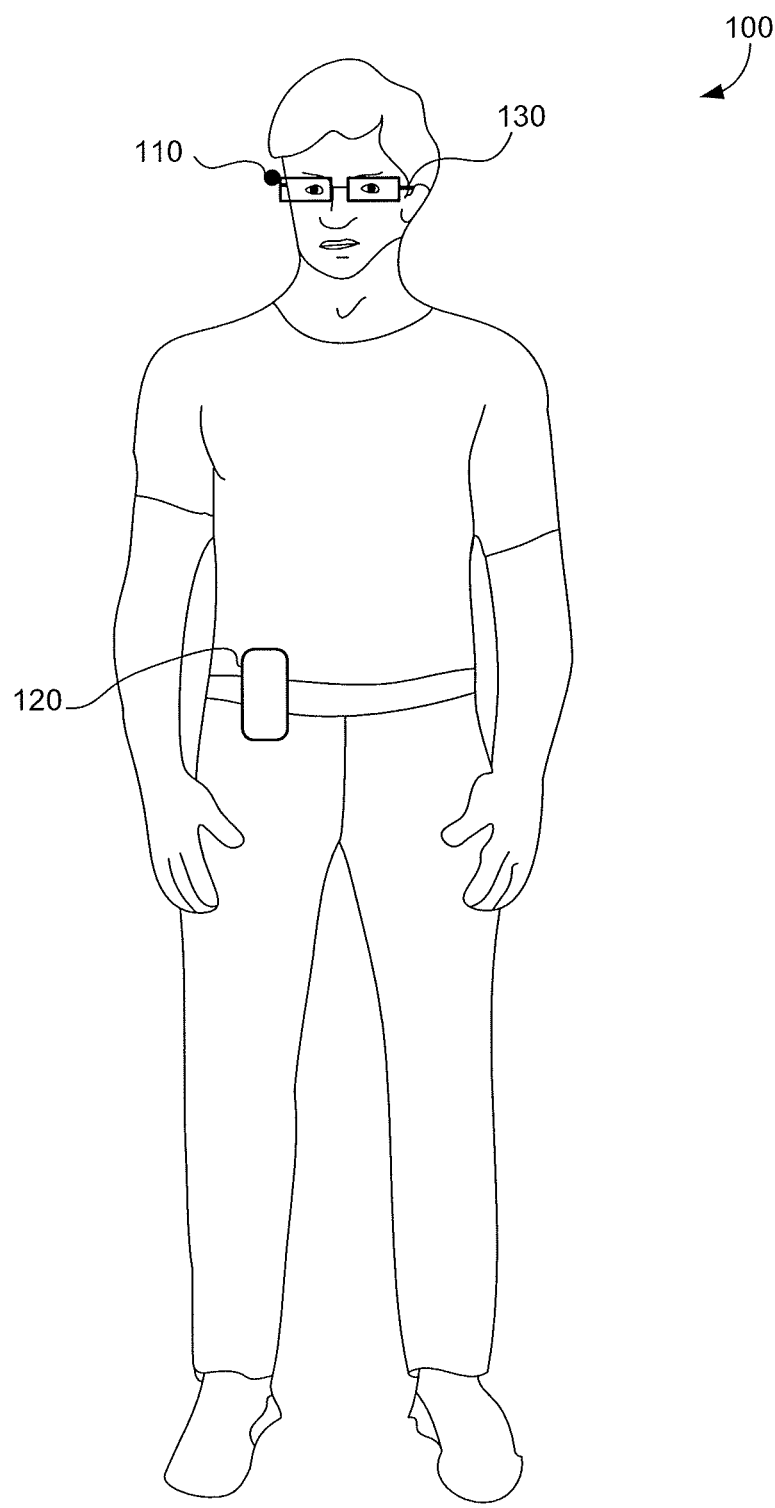
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or more lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
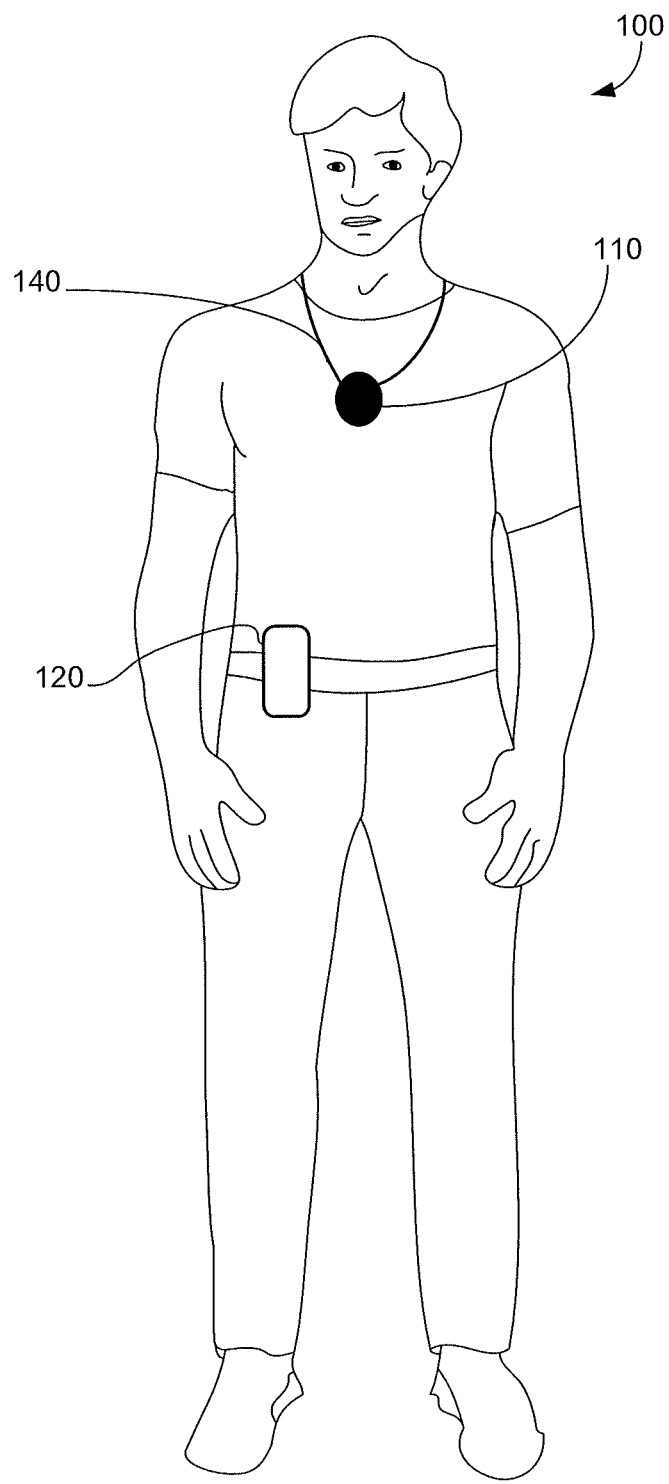
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
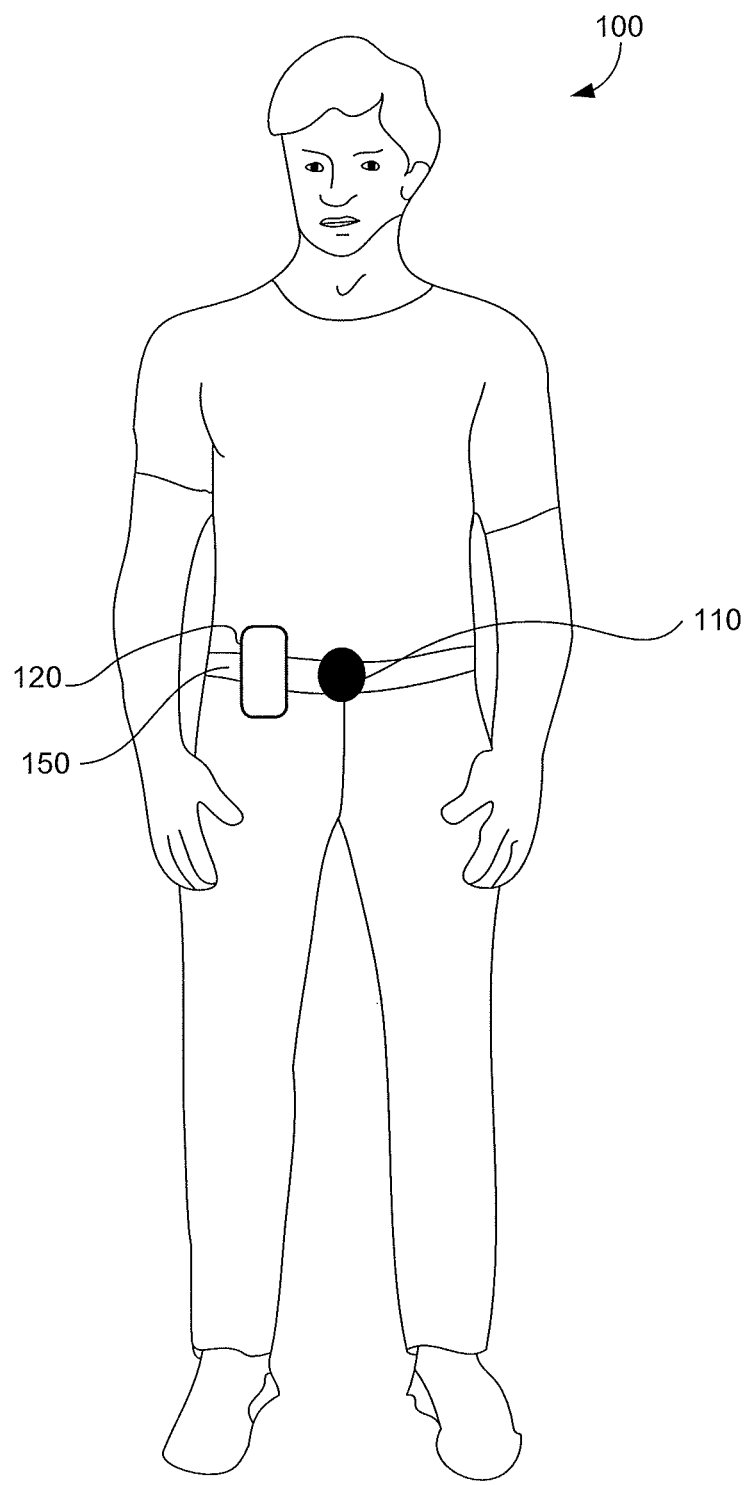
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
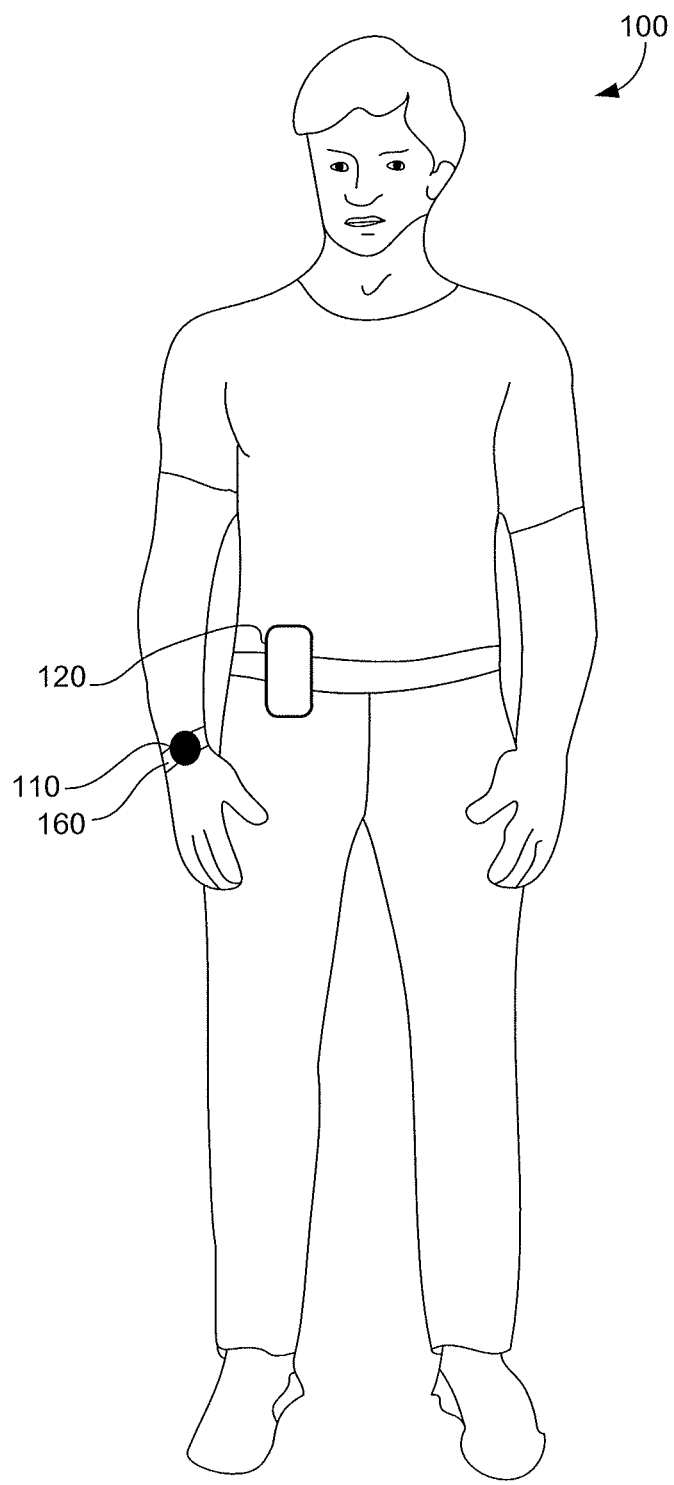
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 2:
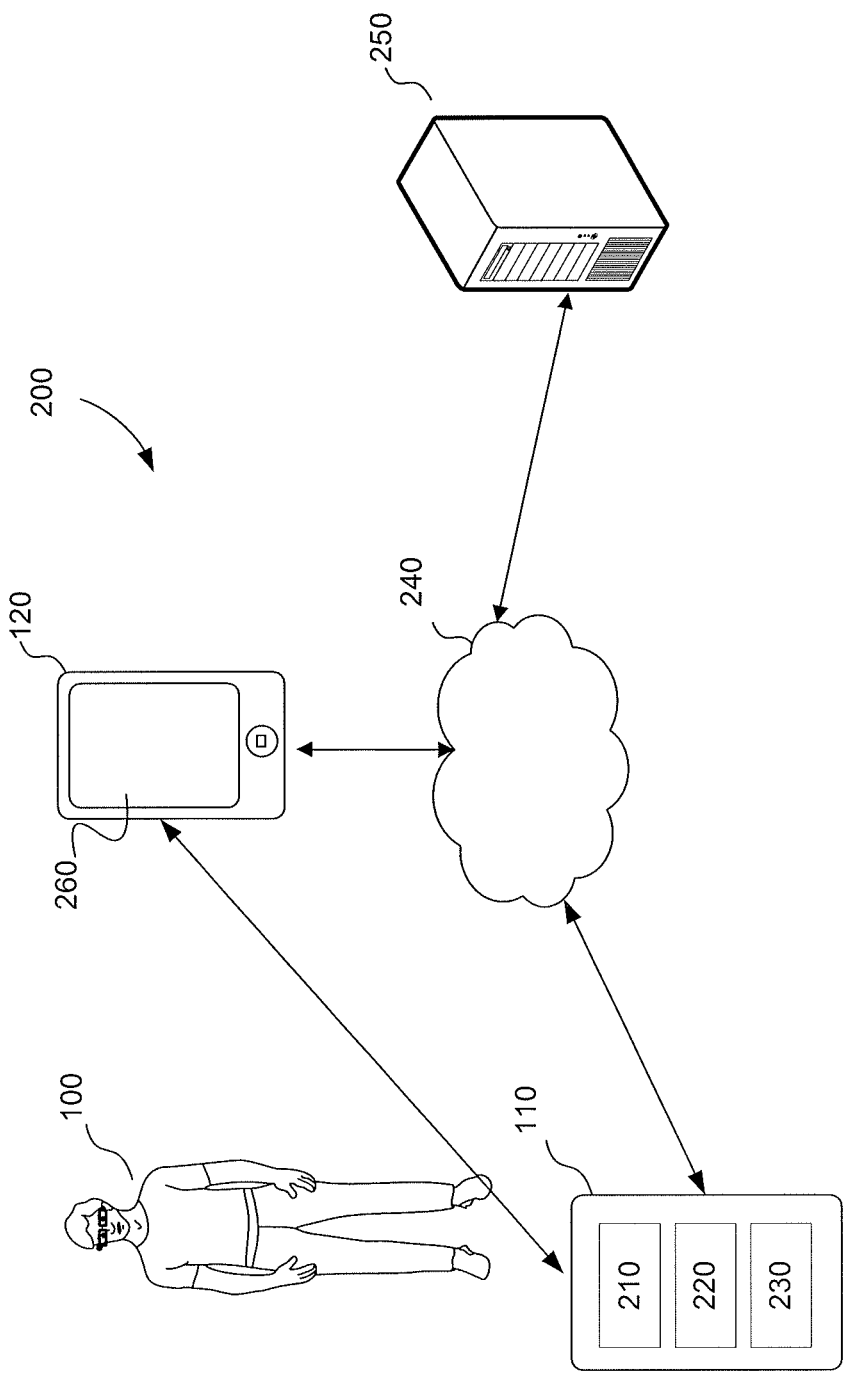
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device"

for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc..

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-field capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
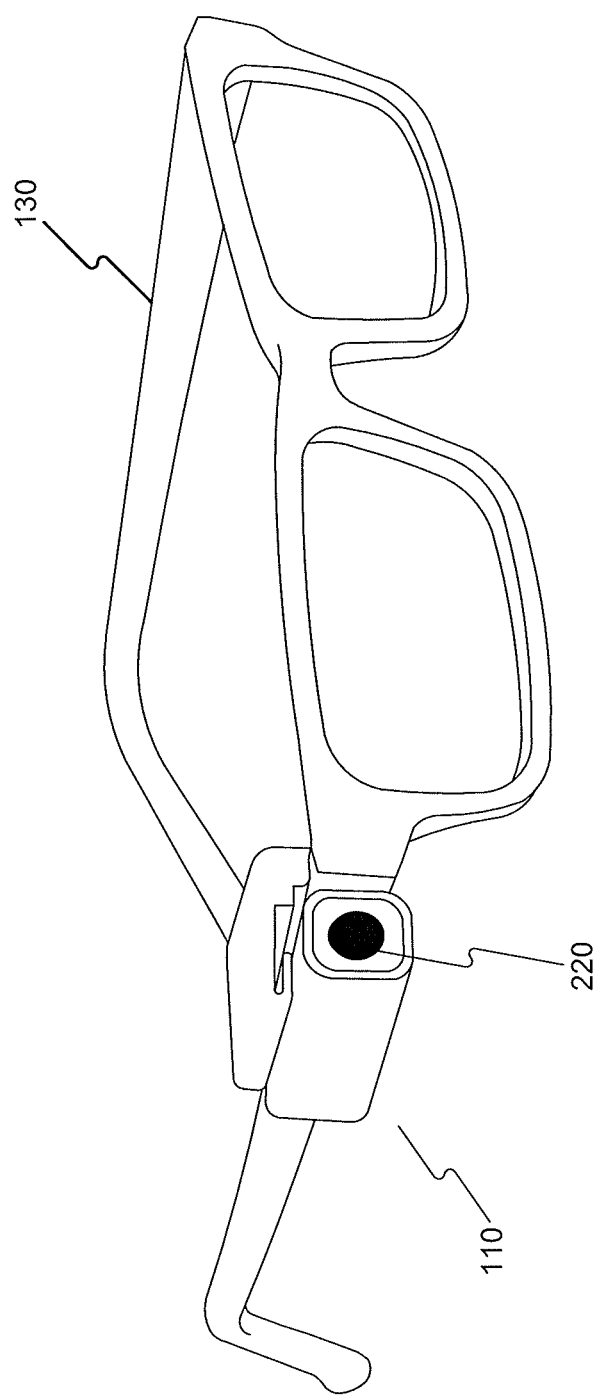
FIG. 3A is a schematic illustration of an example of the wearable apparatus shown in FIG. 1A.

An example wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

Figure 3B:
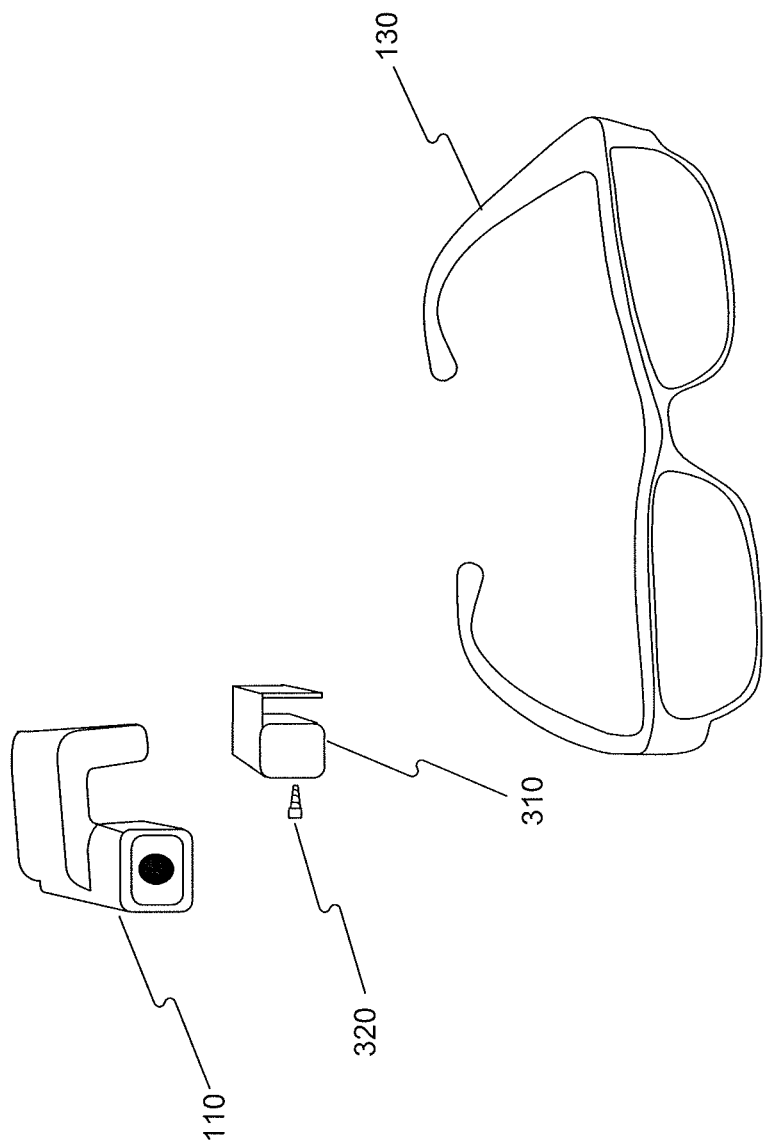
FIG. 3B is an exploded view of the example of the wearable apparatus shown in FIG. 3A.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

Figure 4B:
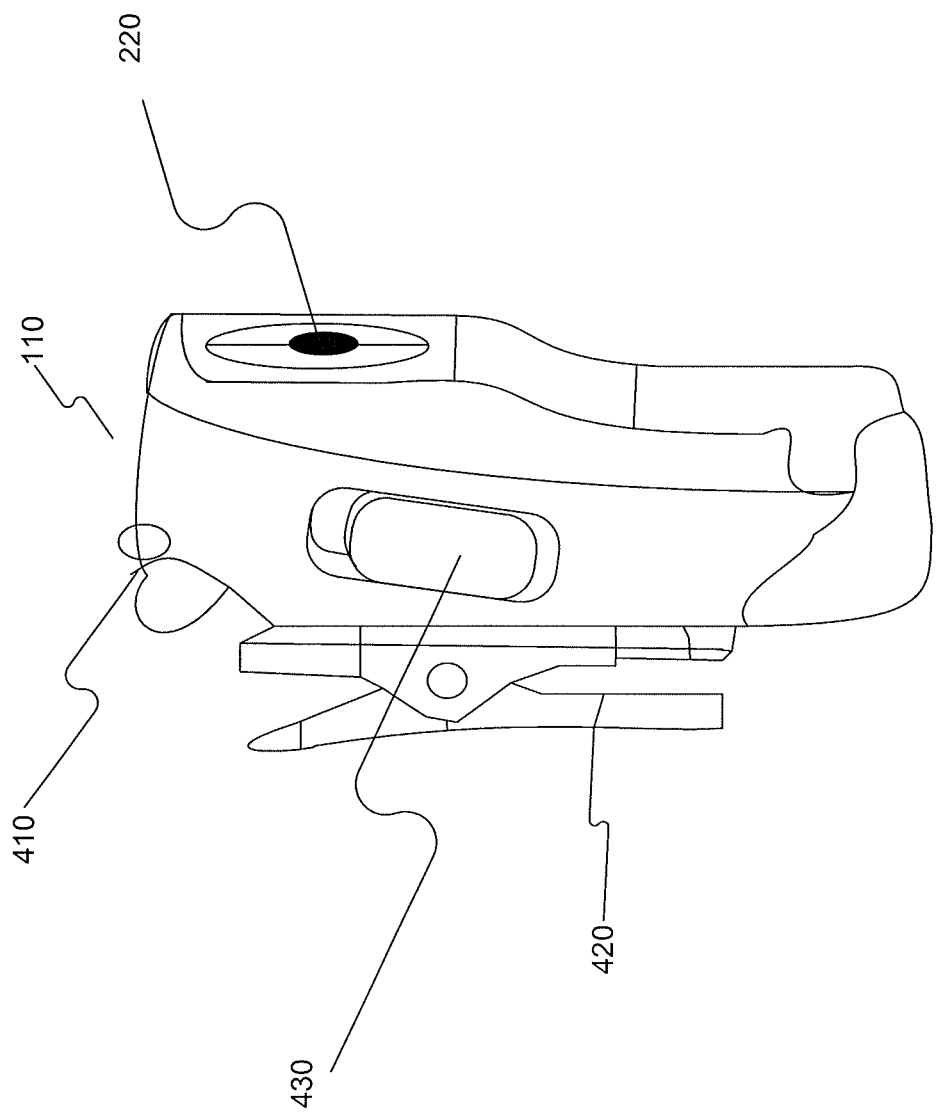
FIG. 4B is a schematic illustration of the example of the wearable apparatus shown in FIG. 1B from a second viewpoint.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
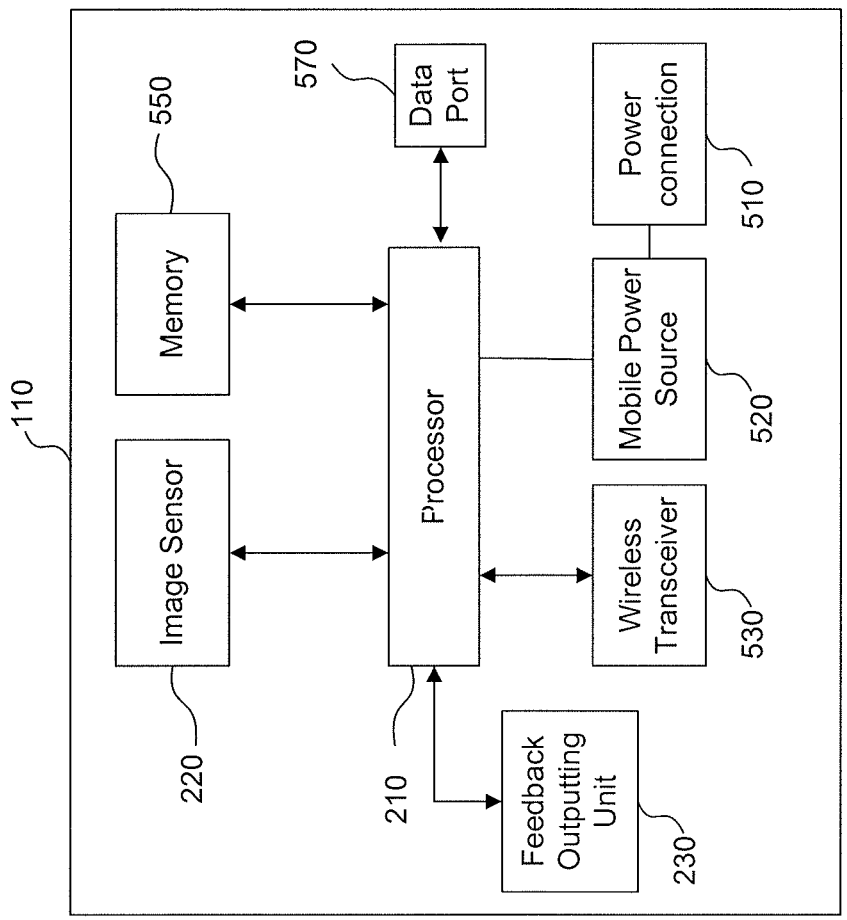
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 510 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
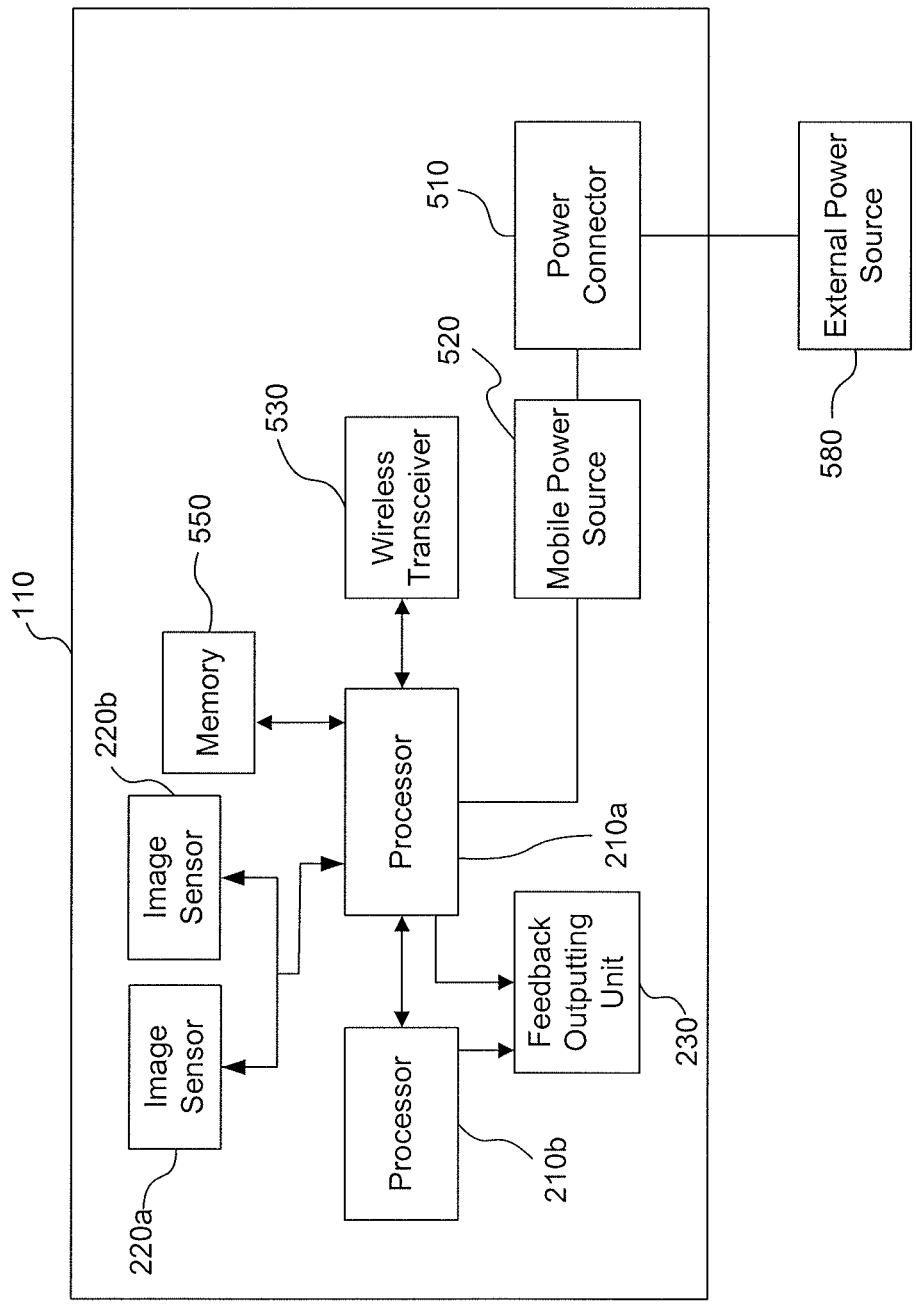
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identified hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
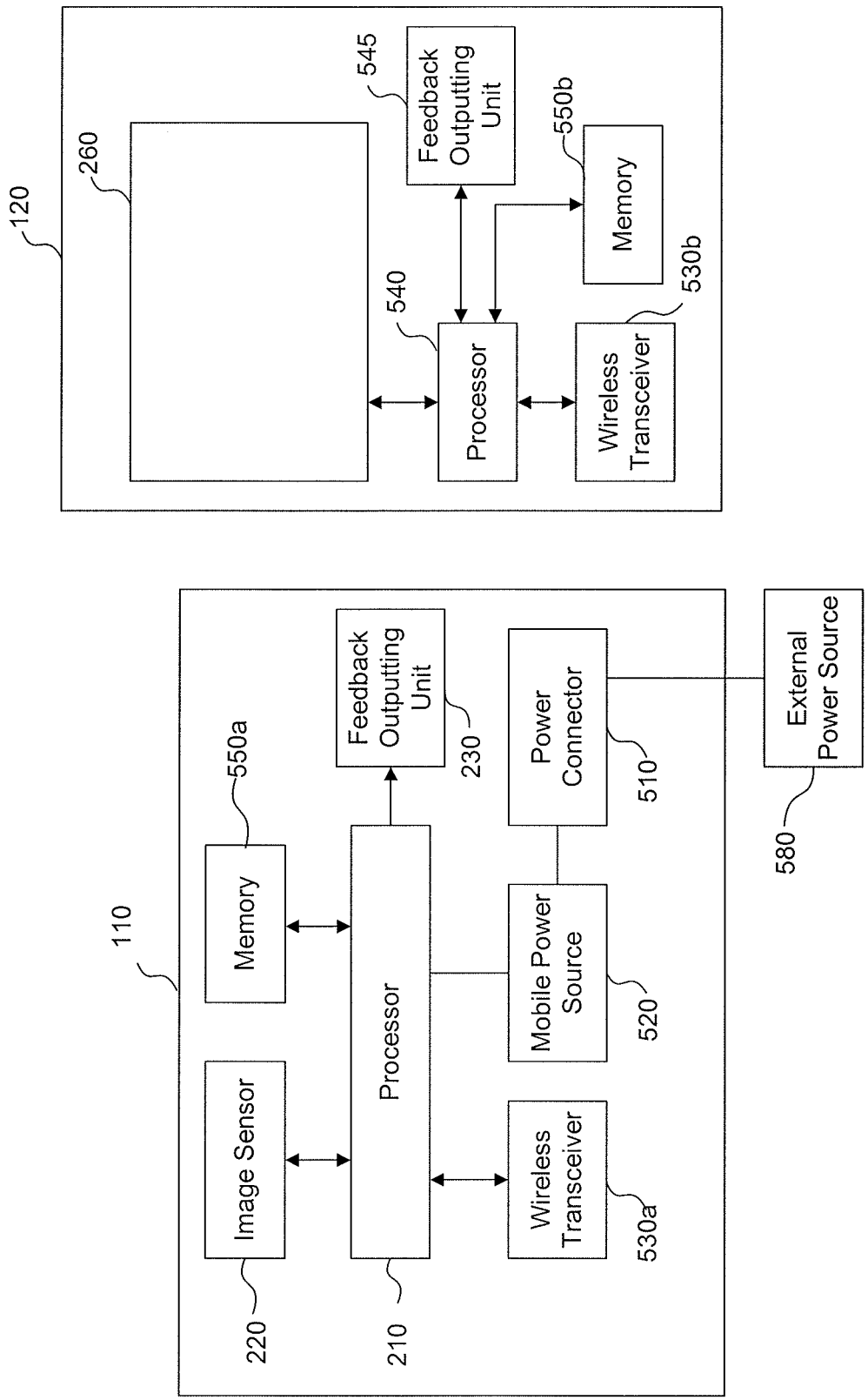
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. Therefore, the foregoing configurations are examples and, regardless of the configurations discussed above, apparatus 110 can capture, store, and process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

One application of wearable technology and "life logging" is the ability to cater advertising to a particular user's daily experience (as reflected, for example, by their "life log") and to gauge the effectiveness of advertising campaigns by crowdsourcing and linking together information related to advertising, purchasing behaviors, and demographics. As one example, an individual user 100 may use a wearable camera system to life log, and the camera system may detect that a particular advertisement has appeared in the environment of the user. The wearable camera system, may, in some embodiments, detect that the user later purchases a product that appeared in the advertisement that appeared in their environment. Information about the user and the purchase may be derived from image data captured by the wearable camera system, and this data may be aggregated across multiple users who perceived the advertisement to determine how much return the advertiser received on their investment.

Figure 6:
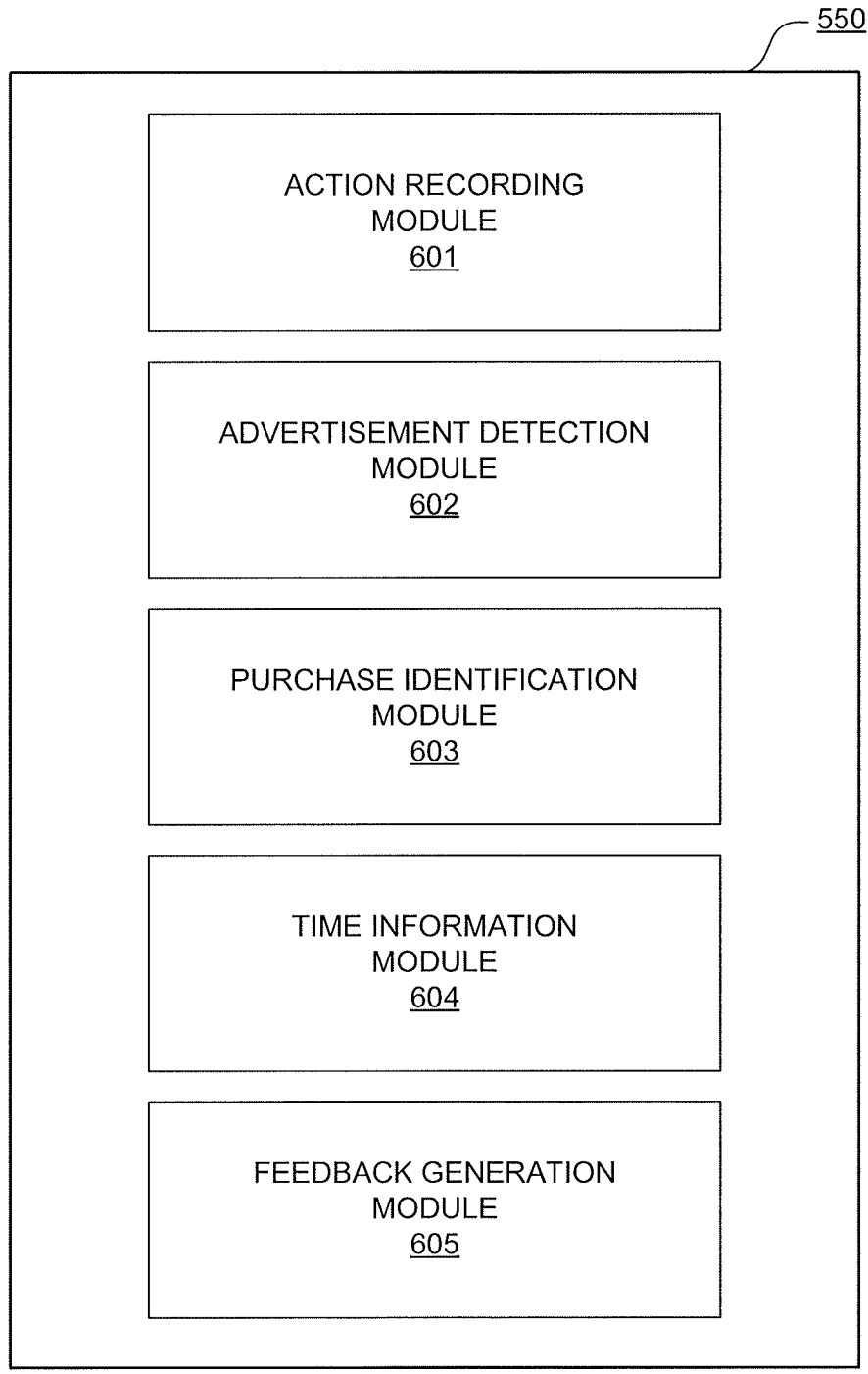
FIG. 6 is a block diagram illustrating an example of a memory contained within a system for analyzing advertisement effectiveness, consistent with disclosed embodiments.

FIG. 6 is a block diagram illustrating memory 550 associated with apparatus 110 according to one embodiment. In the example shown in FIG. 6, memory 550 comprises an action recording module 601, an advertisement detection module 602, a purchase identification module 603, a time information module 604, and a feedback generation module 605.

Action recording module 601 may provide functionality for apparatus 110 to capture and/or store image data. In some embodiments, this image data may include or depict actions performed by user 100 via image sensor 220. For example, as part of "life logging," image sensor 220 may capture anything that appears in the field of view of user 100. Processor 210 may execute action recording module 601 to cause image sensor 220 to acquire the images, and may additionally use action recording module 601 to adjust one or more parameters associated with image sensor 220. In some embodiments, user 100 may be able to start and stop the collection of image data by action recording module 601 and apparatus 110 using function button 430. In other embodiments, apparatus 110 may be configured to capture image data via action recording module 601. In one embodiment, processor 210 and image sensor 220 may be operatively connected via wires or other such mechanical couplings. In other embodiments, processor 210 and image sensor 220 may be operatively connected via wireless transceiver(s) 530.

Advertisement detection module 602 may provide functionality for apparatus 110 to analyze real-time image data captured by image sensor 220 and action recording module 601, and more specifically, to detect that user 100 watched, was in the vicinity of or was otherwise exposed to one or more advertisements. In some embodiments, the advertisement may be audio or video, such as those on television, radio, video billboards, or Internet websites. In other embodiments, the advertisement may be in print form, such as in a newspaper, in a magazine, or on a print billboard. Processor 210 may be configured to execute advertisement detection module 602, for example, to determine which, if any, advertisements were viewed or within the vicinity of user 100 during a particular time period.

Advertisement detection module 602 may also be configured to determine from the captured image data particular information about one or more of an advertisement or about user 100. For example, advertisement detection module 602 may determine a location of the advertisement, an identifier of the advertisement, and a source of the advertisement. Advertisement detection module 602 may also be configured to determine information about the user 100 of apparatus 110, such as demographic information of the user, past behavior of the user, or past purchases made by the user.

Purchase identification module 603 may be configured to detect purchase transactions made by user 100 in the course of their daily activities. Purchase identification module 603 may do so by analyzing image data stored by action recording module 601. As will be described in further detail below, purchase identification module may be configured to detect purchases in a number of ways, such as by identifying a purchased product, identifying an indicia of a completed purchase transaction, such as a receipt, or through other means, such as connecting externally to financial account information associated with user 100.

Time information module 604 may provide functionality for apparatus 110 and processor 210 to determine the elapsed time between events and activities captured by image sensor 220 and action recording module 601. In some embodiments, time information module 604 may generate time information associated with this image data, and may store it within memory 550 for later access and analysis. This time information may take the form of a "timestamp," metadata, or any other such information. In alternative embodiments, time information module 604 may be configured to generate a visual display of the time on images from the captured image data.

Feedback generation module 605 may provide functionality for apparatus 110 to generate and transmit information to user 100, or to a third party or a remote computing system. Processor 210 may execute feedback generation module 605 to generate and process feedback in a given context, then transmit the generated feedback to feedback-outputting unit 320 for output. In one embodiment, processor 210 and feedback-outputting unit 320 may be operatively connected via a wire or other such direct connection. In other embodiments, processor 210 and feedback-outputting unit 320 may be operatively connected via wireless transceiver(s) 530. In some embodiments, feedback generation module 605 may generate audible feedback to user 100 or a third party. In other embodiments, feedback generation module 605 may generate textual or graphical feedback, such as statistics, data, or information.

Action recording module 601, advertisement detection module 602, purchase identification module 603, time information module 604, and feedback generation module 605 may be implemented in software, hardware, firmware, a mix of any of those, or the like. For example, if the modules are implemented in software, they may be stored in memory 550, as shown in FIG. 6. Other components of processor 210 may be configured to perform processes to implement and facilitate operations of the modules. Thus, action recording module 601, advertisement detection module 602, purchase identification module 603, time information module 604, and feedback generation module 605 may include software, hardware, or firmware instructions (or a combination thereof) executable by one or more processors (e.g., processor 210), alone or in various combinations with each other. For example, the modules may be configured to interact with each other and/or other modules of apparatus 110 to perform functions consistent with disclosed embodiments. In some embodiments, any of the disclosed modules (e.g., action recording module 601, advertisement detection module 602, purchase identification module 603, time information module 604, and feedback generation module 605) may each include dedicated sensors (e.g., image sensors, etc.) and/or dedicated application processing devices to perform the functionality associated with each module.

As used herein, real-time image data may refer to image data captured in real-time or near real-time. For example, action recording module 601 may monitor the field-of-view of apparatus 110 to detect inputs. Accordingly, action recording module 601 and any of the other disclosed modules may operate in parallel to process captured image data. That is, apparatus 110 may capture and analyze image data in parallel, or may institute a queue-like implementation whereby image data is captured and then analyzed in a continuous fashion (i.e., a first image is captured and analyzed while a subsequent image is captured and then subsequently analyzed).

Figure 7A:
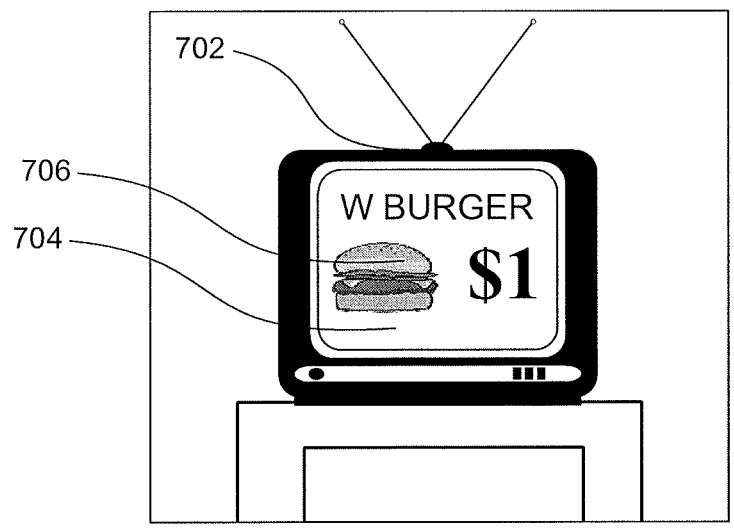
FIGS. 7A-7C are example illustrations of image data captured by a wearable camera system as part of a system for analyzing advertisement effectiveness, consistent with disclosed embodiments.
Figure 7B:
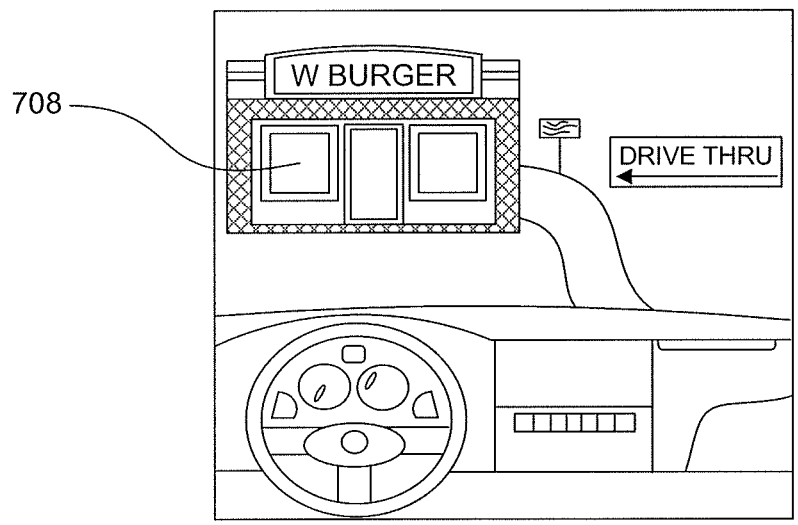
Figure 7C:
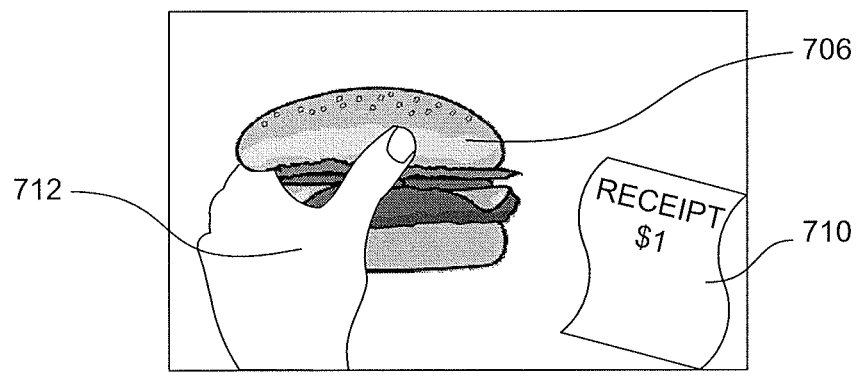

FIGS. 7A-7C illustrate examples of image data captured by apparatus 110 representing fields of view of image sensor 220, consistent with certain disclosed embodiments. In some embodiments, the field of view of image sensor 220 may correspond to or be similar to the field of view of user 100. In the example of FIG. 7A, image data captured by image sensor 220 indicates that user 100 may be watching television 702. In FIG. 7A, television 702 is broadcasting an advertisement 704. In this example, the product 706 featured in the advertisement 704 is a hamburger from "W BURGER," advertised at an apparent sale price of one dollar. Product 706 may include, but not be limited to, food, a service, or any other tangible object.

Consistent with disclosed embodiments, apparatus 110, via action recording module 601, may record that the W BURGER advertisement 704 was presented to user 100. Via advertisement detection module 602, apparatus 110 may detect that advertisement 704 was recorded in the image data captured by image sensor 220, and may execute software instructions to derive information about one or more of user 110 or advertisement 704. In some embodiments, advertisement detection module 602 may derive information from the captured image data related to one or more occurrences of advertisement 704. In these embodiments, the derived information may include one or more of a location of advertisement 704, an identifier of the advertisement (such as a mark, a logo, a jingle, or the appearance of product 706), and a source of the advertisement (such as television 702). Advertisement detection module 602 may further determine information about user 100 at the time when advertisement 704 was displayed. In these embodiments, the user information may include demographic information such as age, income, marital status, gender, geographic location, etc. Processor 210 may be configured to store the user and/or advertisement information derived from the image data, for example, in memory 550. In these embodiments, the information may be stored in a profile or other file associated with user 100. The stored profile information may be used by one or more of action recording module 601 or advertisement detection module 602 to identify user 100 in the future within image data captured by image sensor 220.

FIG. 7B illustrates another example of image data capable of being captured by image sensor 220 and action recording module 601. In the example of FIG. 7B, user 100 can be seen to be driving in an automobile to location 708. Here, location 708 is shown to be a location of W BURGER, which was the fast food restaurant shown in FIG. 7A as the source of advertisement 704 and product 706. Consistent with disclosed embodiments, one or more of action recording module 601, advertisement detection module 602, or purchase identification module 603 may execute software instructions to detect a location, such as location 708, which may be associated with previously-viewed advertisement 704.

FIG. 7C illustrates still another example of image data capable of being captured by image sensor 220 and stored by action recording module 601. In the example of FIG. 7C, user 100 can be seen to have purchased the product 706 (here, a hamburger) from location 708, as evidenced by receipt 710. The hand 712 of user 100 can be seen to be holding the hamburger 706. In some embodiments, apparatus 110 (via one or more of action recording module 601 or purchase identification module 603) may be configured to identify, based on previously derived information about user 100 or advertisement 704, a product 706 associated with advertisement 704 that has been acquired by user 100. In these embodiments, processor 210 of apparatus 110 (via time information module 604) may be configured to determine, based on captured image data, an amount of time from when advertisement 704 was viewed by user 100 to when user 100 acquired product 706.

Figure 8:
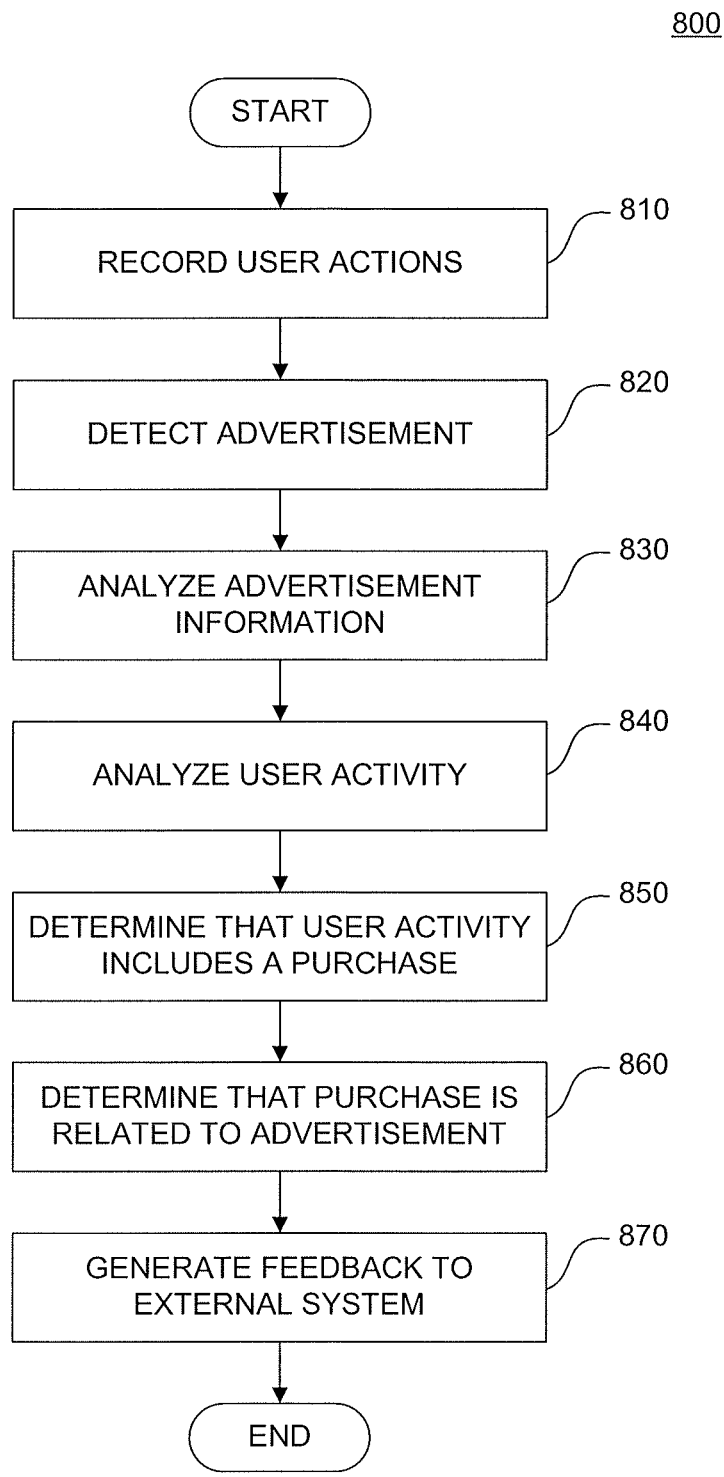
FIG. 8 is an example of a process for analyzing advertisement effectiveness, consistent with disclosed embodiments.

FIG. 8 illustrates an example of a process 800 for analyzing advertisement effectiveness consistent with certain disclosed embodiments. Process 800, as well as any or all of the individual steps therein, may be performed by various aspects of apparatus 110, such as processor 210, image sensor 220, action recording module 601, advertisement detection module 602, purchase identification module 603, time information module 604, or any subcomponents therein. In some embodiments, one or more steps of process 800 may be performed by a remote computing system, such as server 250. For exemplary purposes, FIG. 8 is described as being performed by processor 210, executing software instructions stored within memory 550.

Processor 210 may execute software instructions via action recording module 601 that enable apparatus 110 to capture real-time image data representing actions of a user 100 using a camera associated with an image sensor, such as image sensor 220 (Step 810). In some embodiments, the captured first set of real-time image data may be received as a single streaming video file. In other embodiments, the real-time image data may be received as a series of still images. When the captured image data is received, processor 210 may store the data in memory 550. In some embodiments, processor 210 may be configured to begin recording image data via action recording module 601 after identifying one or more triggers in image data captured by image sensor 220 of apparatus 110. The term "trigger" includes any information in the image data that may cause apparatus 110 to execute an action. For example, apparatus 110 may detect as a trigger a finger or hand of user 100 holding a product 706 associated with an advertisement 704, and may record data at that point. In FIG. 7C, hand 712 may be an example of such a trigger. In these embodiments, processor 210 may be configured to transmit image data (either stored data or in real time) to a remote system such as server 250 for purposes of analyzing the image data to determine whether a trigger is present in the image data.

In alternative embodiments, action recording module 601 may not record any data; instead, advertisement detection module 602 and purchase information module 603 may simply analyze images viewed through image sensor 220. In these embodiments, information relating to an advertisement 704, to a product 706, or to user 100 may be extracted by advertisement detection module 602 and purchase information module 603, and the information may be transmitted to an external system, such as server 250.

Processor 210 may execute software instructions via one or more of action recording module 601 or advertisement detection module 602 that enable apparatus 110 to detect that user 100 has perceived the presence of an advertisement, such as advertisement 704 described above (Step 820). In some embodiments, Step 820 may be performed by a remote computing system, such as server 250. These modules may further be executed to analyze information related to advertisement 704 (Step 830), such as one or more products 706 being advertised, a source of the advertisements, such as restaurant chain 708 described above, an identifier of the advertisement, or a geographic location where the advertisement was perceived. In some embodiments, Step 830 may be performed by a remote computing system, such as server 250. In some embodiments, processor 210 (via advertisement detection module 602 and time information module 604) may determine that user 100 has, over time, perceived multiple occurrences of advertisement 704.

Via one or more of action recording module 601, purchase identification module 603, and time information module 604, processor 210 may analyze the activity of user 100 over a period of time after user 100 has perceived advertisement 704 (Step 840). In some embodiments, Step 840 may be performed by a remote computing system, such as server 250. Time information module 604 may be configured to assist processor 210 in analyzing the activity of user 100 via image data captured by image sensor 220 over a predetermined time period, such as hours, days, weeks, months, or years. Processor 210 may, via time information module 604, also determine set periods of time at which image data or related information may be compiled. In these embodiments, the data may be sent to a remote system, such as server 250 for further analysis. Time information module 604 may determine that the data be compiled and transmitted on an hourly, daily, weekly, monthly, or yearly basis. Additionally or alternatively, processor 210 and time information module 604 may send the data to server 250 in real-time for analysis.

Through this analysis, processor 210 (via purchase identification module 603) may determine that the activity of user 100 over the predetermined period of time set by time information module 604 includes a purchase (Step 850). In some embodiments, Step 850 may be performed by a remote computing system, such as server 250. Purchase identification module 603 may determine a purchase has taken place by any method. For example, in the illustration of FIG. 7C, the presence of a purchased product 706 and a receipt 710 may indicate that a purchase has taken place. In other embodiments, apparatus 110 may include a microphone, and purchase identification module 603 may be configured to access the microphone and analyze audio data that may be captured along with the image data. In the illustration of FIGS. 7B-7C, for example, apparatus 110 and an associated microphone may detect dialog indicating that a purchase transaction is taking place. In some embodiments, apparatus 110 may be additionally or alternatively configured to access external data and sources of information to determine that one or more purchases have been made by user 100. For example, apparatus 110 may be configured to access personal financial software associated with user 100, and may be further configured to determine by analyzing transactions associated with a financial or credit account of user 100 that one or more purchases were made at a particular location 708. In other embodiments, apparatus 110 (via purchase identification module 603) may access banking sites associated with user 100, social media accounts associated with user 100, the user's life log information, stored shopping lists, etc. to identify that a purchase is planned, is in progress, or has already occurred.

Processor 210 (via purchase identification module 603) may determine that one or more purchases made by user 100 are related to the previously-perceived advertisement 704 (Step 860), and may determine relevant information related to that purchase. In some embodiments, Step 860 may be performed by a remote computing system, such as server 250. In some embodiments, purchase identification module 603 may determine, via analysis of image data such as the example of FIGS. 7A-7C, that the identical product 706 depicted in advertisement 704 was later purchased by user 100. In other embodiments, purchase identification module 603 may determine that a related, competing product was purchased instead of product 706. In still other embodiments, purchase identification module 603 may determine whether the product(s) were purchased from the location 708 sponsoring the advertisement 704. In yet other embodiments, purchase identification module 603 may determine that no product related to advertisement 704 was purchased by user 100. Alternatively, purchase identification module 603 may determine that a particular user 100 did purchase a product 706 featured in an advertisement 704, but that that user 100 did not actually perceive the advertisement 704. In these embodiments, user 100 may have heard about product 706 through word of mouth, may have intended to buy the product regardless of advertisement 704, may have heard about product 706 through alternative means (such as social media), etc.

Processor 210 may further determine additional information and/or statistics associated with user 100 relating to the purchase. This information may include, but not be limited to, demographic information (as described above), past behavior of the user 100 (as indicated by action recording module 601), information relating to advertisements perceived by the user 100 (as indicated by one or more of action recording module 601, advertisement detection module 602, and/or time information module 604), and information related to past purchases made by the user 100 (as indicated by action recording module 601 and/or purchase identification module 603).

Via feedback generation module 605, processor 210 may be configured to generate feedback relating to one or more of advertisement 704 or user 100 to one or more external apparatuses or systems (Step 870). In some embodiments, Step 870 may be performed by a remote computing system, such as server 250. The feedback may contain the information about the advertisement 704 and user 100 above, or various other statistics, metrics, or information that may be relevant to determining the effectiveness of an advertising campaign. The feedback may contain information about various activities and behaviors performed by user 100 that may be valuable information for the sponsor of the original advertisement 704. The feedback may be sent to an external computing system associated with the sponsor of the advertisement or to other such retailers. Additionally or alternatively, feedback generation module 605 may store the feedback in the user's life log, or may make posts on social media associated with the user. In some embodiments, the feedback may be used by an advertiser or retailer to craft additional advertisements for user 100, or to provide user 100 with an incentive offer such as a coupon.

Figure 9:
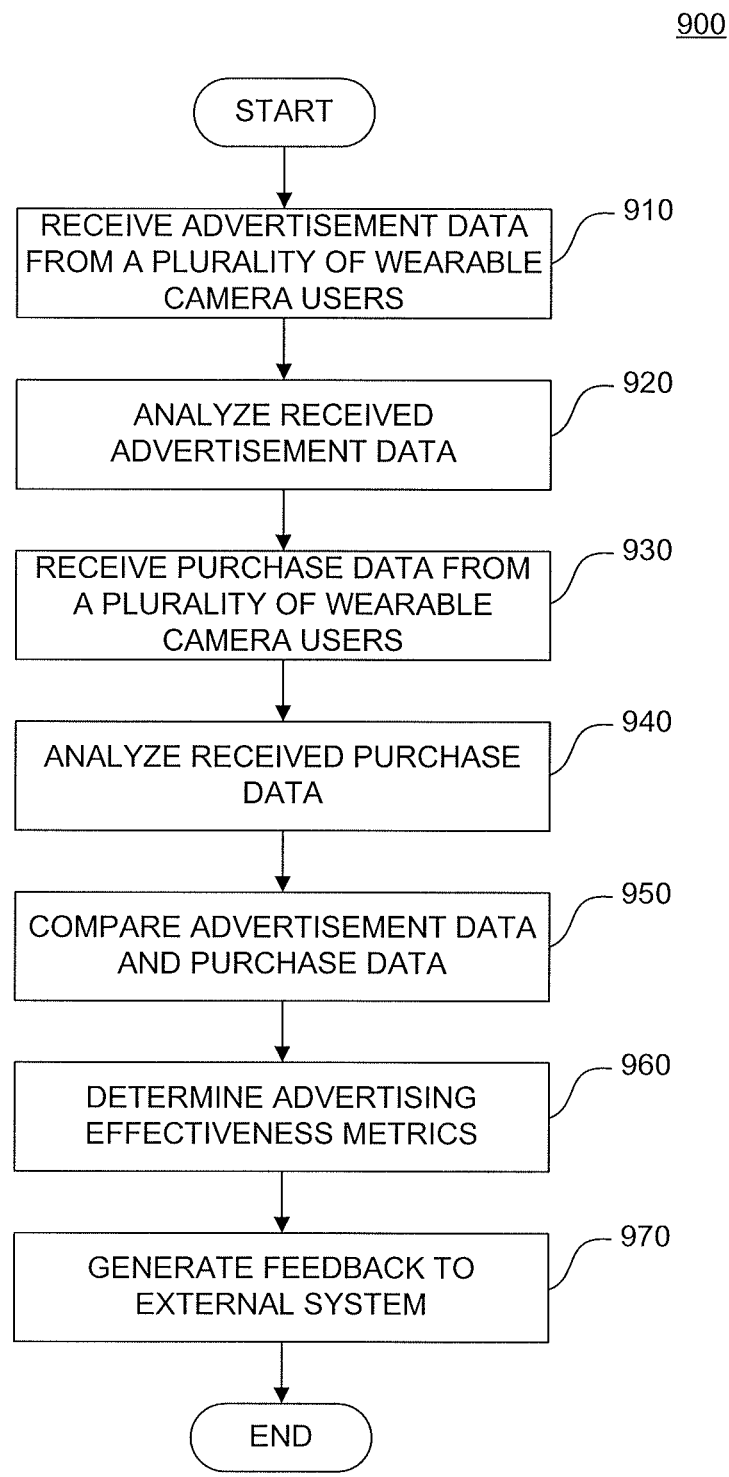
FIG. 9 is an example of a process for analyzing advertisement effectiveness, consistent with disclosed embodiments.

FIG. 9 illustrates an example of a process 900 for analyzing advertisement effectiveness consistent with certain disclosed embodiments. Process 900, as well as any or all of the individual steps therein, may be performed by various aspects of apparatus 110, such as processor 210, image sensor 220, action recording module 601, advertisement detection module 602, purchase identification module 603, time information module 604, or any subcomponents therein. Process 900 may also be performed by a remote computing system (e.g., server 250) that includes a processing device and a memory 550 containing the same modules as those illustrated in FIG. 6. The remote system (such as server 250) may, in some embodiments, be configured to share a physical casing with apparatus 110 or to share other components of the apparatus. Server 250 may also be capable of executing software instructions to perform actions consistent with disclosed embodiments that are located on non-transitory computer readable media. For exemplary purposes, FIG. 9 is described as being performed by Server 250.

A processor associated with server 250 may receive advertisement data from a plurality of wearable camera systems (Step 910). For example, this may correspond to aggregated feedback (i.e., the assembled purchase information and user information from multiple users 100 generated by feedback generation module 6050 received from multiple individual apparatuses 110 in Step 870 of process 800 described previously. Via advertisement detection module 602, the processor may analyze this aggregated received data (Step 920), to extract relevant information such as the determined statistics, data and information as described above in association with FIGS. 7A-7C and 8.

The processor of server 250 may receive purchase data from a plurality of wearable camera systems (Step 930). For example, this may correspond to aggregated feedback generated by multiple individual apparatuses 110 in Step 870 of process 800 described previously. Via a purchase identification module 603 and/or a time identification module 604, the processor may analyze this aggregated received data (Step 940), to extract relevant information such as the determined statistics, data and information as described above in association with FIGS. 7A-7C and 8.

The processor of the remote system, using any or all of advertisement detection module 602, purchase identification module 603, time information module 604, or any subcomponents therein, or software products on non-transitory computer readable media, may compare the received aggregated, analyzed advertisement data and purchase data from the plurality of wearable camera systems (Step 950) and may, in the course of the comparison, use the aggregated, analyzed data to determine one or more relevant metrics to determine the effectiveness of a related advertising campaign (Step 960). Metrics of interest may include, but not be limited to, the number of wearable camera system users that viewed a particular advertisement, the number of products featured in the advertisement that were purchased by wearable camera system users who viewed the advertisement, the amount of time elapsed between the viewing (or recording) of the advertisement by users of a wearable camera system and the purchasing of a featured product, or any other such statistic that may be of interest to an advertiser or a retailer in assessing the effectiveness of an advertising campaign. An advertising campaign may be considered "effective" based on predetermined criteria. For example, the criteria may include, but not be limited to, a particular number of times that the advertisement was viewed, a particular number of products purchased by users who viewed the advertisement, or a particular average time between viewing of the advertisement and purchase of an associated product.

For example, the processor may identify one or more subgroups among the users 100 of the wearable camera systems. The subgroups may be delineated in some embodiments based, at least in part, on the user data derived from captured image data described above in association with FIGS. 7A-7C and 8. The subgroups may be based on at least one of demographic information, past behavior of the users 100 or information related to past purchases made by the users 100. Purchase data associated with the users 100 comprising the various subgroups may then be analyzed and compared. For example, via a purchase identification module 603, the processor may determine how many occurrences of a particular advertisement 704 were perceived by the users 100 within a particular subgroup. This determined information may provide insight to a location 708 or a related advertising entity on how much penetration a particular advertisement 704 may have achieved in a given market of users 100. Purchase identification module 603 may further determine statistics or other data relating to individual users 100 from within one or more subgroups. In some embodiments, statistics may be determined for users 100 who viewed one or more occurrences of an advertisement 704 and then went on to purchase a product 706 associated with the advertisement. In other embodiments, statistics may be determined for users 100 who did not view an advertisement 704, but who later purchased a related product 706 regardless. In still other embodiments, statistics may be determined for users 100 who did not view an advertisement 704 and did not purchase a related product 706. In yet other embodiments, statistics may be determined for users 100 who viewed an advertisement 704, but did not purchase a related product 706.

These determined statistics may be analyzed by the processor, and used to assess the effectiveness (or lack thereof) of a particular advertisement 704 with respect to subsequent purchases of related product 706. The processor may be configured to generate feedback via a feedback generation module 605 to include these analyzed, compiled statistics, data, and information into reports, publications, etc. (Step 970). The feedback may be provided to location 708 or other third parties, and may assist in designing future advertisements 704 or in developing future products 706. The feedback may contain information about various activities and behaviors performed by user 100 that may be valuable information for the sponsor of the original advertisement 704. The feedback may be sent to an external computing system associated with the sponsor of the advertisement or to other such retailers. Additionally or alternatively, feedback generation module 605 may store the feedback in the user's life log, or may make posts on social media associated with the user. In some embodiments, the feedback may be used by an advertiser or retailer to craft additional advertisements for user 100, or to provide user 100 with an incentive offer such as a coupon.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for analyzing advertisement effectiveness using information provided by a wearable camera system, the system comprising:
   a memory storing executable instructions; and
   at least one processing device programmed to execute the instructions to:
      receive, from the wearable camera system, first image data captured by the wearable camera system in an environment of a user of the wearable camera system in response to a hand-related trigger detected by the wearable camera system, wherein:
         the wearable camera system includes a wearable image sensor configured to be worn on an exterior of attached to one or more of glasses or clothing of the user, and
         the wearable camera system includes a processor configured to adjust an aiming direction of the image sensor;
      determine, based on the received first image data, information related to one or more occurrences of an advertisement in the environment of the user of the wearable camera system;
      receive, from the wearable camera system, second image data captured by the wearable camera system;
      determine, based on the received second image data, information relating to one or more activities of the user, wherein the information relating to the one or more activities of the user includes a purchase receipt and purchase information relating to the purchase receipt; and
      identify, based on the information related to the one or more occurrences of the advertisement and the information related to the one or more activities of the user, a product acquired by the user that is associated with the advertisement.

2. The system of claim 1, wherein the information related to the one or more occurrences of the advertisement includes at least one of: a location of the advertisement, an identifier of the advertisement, and a source of the advertisement.

3. The system of claim 1, wherein the at least one processing device is further programmed to determine, based on the second image data, one or more locations at which the product was purchased.

4. The system of claim 1, wherein the at least one processing device is further programmed to determine, based on the second image data, an amount of time from when the advertisement was viewed by the user to when the user purchased the product.

5. The system of claim 1, wherein the at least one processing device is further programmed to associate the information related to the one or more activities of the user with demographic information of the user.

6. The system of claim 5, wherein the demographic information is stored in a profile of the user.

7. The system of claim 5, wherein the at least one processing device is further programmed to determine, based on the second image data, the demographic information.

8. The system of claim 1, wherein the product includes at least one of: food, a service, and a tangible object.

9. The system of claim 1, wherein the system shares a physical casing with the wearable camera system or shares components of the wearable camera system.

10. A system for analyzing advertisement effectiveness, the system comprising:
a memory storing executable instructions; and
at least one processing device programmed to execute the instructions to:
receive, from a plurality of wearable camera systems, first image data captured by the wearable camera systems an advertisement in environments of users of the wearable camera systems, wherein the first image data includes first image data captured by at least one of the wearable camera systems in response to a hand-related trigger detected by the at least one of the wearable camera systems, the at least one of the wearable camera systems including a wearable image sensor and a processor configured to adjust an aiming direction of the image sensor;
determine, based on the received first image data, information related to one or more occurrences of the advertisement;
receive, from the plurality of wearable camera systems, second image data captured by the wearable camera systems;
determine, based on the received second image data, information relating to one or more activities of the users, wherein the information relating to the one or more activities of the users includes a purchase receipt and purchase information relating to the purchase receipt;
identify, based on the determined information relating to one or more activities of the users, one or more of the users of the plurality of wearable camera systems who purchased one or more products included in the advertisement;
analyze the determined information relating to one or more activities of the users to identify the one or more products included in the advertisement that were purchased; and
determine, based on the analysis, an effectiveness of the advertisement.

11. The system of claim 10, wherein the information related to the one or more occurrences of the advertisement includes information derived from the first or second image data captured by the plurality of wearable camera systems.

12. The system of claim 10, wherein the effectiveness includes an indication of how many of the users who viewed the advertisement purchased one or more products associated with the advertisement.

13. The system of claim 10, wherein the information related to the one or more occurrences of the advertisement includes at least one of: a location of the advertisement, an identifier of the advertisement, and a source of the advertisement.

14. The system of claim 10, wherein at least one processing device is further programmed to analyze the information to determine locations at which the one or more products were purchased.

15. The system of claim 10, wherein the product includes at least one of: food, a service, and a tangible object.

16. A system for analyzing advertisement effectiveness, the system comprising:
a memory storing executable instructions; and
at least one processing device programmed to execute the instructions to:
receive, from a plurality of wearable camera systems, first image data captured by the wearable camera systems an advertisement in environments of users of the wearable camera systems, wherein the first image data includes first image data captured by at least one of the wearable camera systems in response to a hand-related trigger detected by the at least one of the wearable camera systems, the at least one of the wearable camera systems includes a wearable image sensor and a processor configured to adjust an aiming direction of the image sensor;
determine, based on the received first image data, information related to one or more occurrences of the advertisement;
receive, from the plurality of wearable camera systems, second image data captured by the wearable camera systems;
determine, based on the second image data, information related to purchases made by the users of the wearable camera systems, wherein the information includes the identity of one or more products purchased by the users and purchase information obtained from a purchase receipt received by at least one of the users and detected by the corresponding wearable camera system from the corresponding image data; and
determine, based on the information related to the one or more occurrences of the advertisement and the information related to the purchases made by the users of the wearable camera systems, statistics on the users who viewed the advertisement and purchased one or more products associated with the advertisement.

17. The system of claim 16, wherein the at least one processing device is further programmed to:
determine, based on the information related to the one or more occurrences of the advertisement and the information related to the purchases made by the users of the wearable camera systems, statistics on the users who did not view the advertisement and purchased one or more products associated with the advertisement.

18. The system of claim 16, wherein the at least one processing device is further programmed to:
identify a subgroup of the users; and
determine, based on the information related to the one or more occurrences of the advertisement and the information related to the purchases made by the users of the wearable camera systems, statistics on the users from the subgroup of the users who viewed the advertisement and purchased one or more products associated with the advertisement.

19. The system of claim 18, wherein the subgroup of the users is determined based on at least one of the following: demographic information, past behavior of the users, and information related to past purchases made by the users.

20. The system of claim 16, wherein the at least one processing device is further programmed to:
identify a subgroup of the users; and
determine, based on the information related to the one or more occurrences of the advertisement and the information related to the purchases made by the users of the wearable camera systems, statistics on the users from the subgroup of the users who did not view the advertisement and purchased one or more products associated with the advertisement.

21. The system of claim 20, wherein the subgroup of the users is determined based on at least one of the following:

demographic information, past behavior of the users, and information related to past purchases made by the users.

22. The system of claim 16, wherein the at least one processing device is further programmed to:
   determine, based on the information related to the one or more occurrences of the advertisement and the information related to the purchases made by the users of the wearable camera systems, statistics on the users who did not view the advertisement and did not purchase a product associated with the advertisement.

23. The system of claim 16, wherein the at least one processing device is further programmed to:
   identify a subgroup of the users; and
   determine, based on the information related to the one or more occurrences of the advertisement and the information related to the purchases made by the users of the wearable camera systems, statistics on the users from the subgroup of the users who viewed the advertisement and did not purchase a product associated with the advertisement.

24. The system of claim 23, wherein the subgroup of the users is determined based on at least one of the following: demographic information, past behavior of the users, and information related to past purchases made by the users.

25. The system of claim 16, wherein the at least one processing device is further programmed to:
   identify a subgroup of the users; and
   determine, based on the information related to the one or more occurrences of the advertisement and the information related to the purchases made by the users of the wearable camera systems, statistics on the users from the subgroup of the users who did not view the advertisement and did not purchase a product associated with the advertisement.

26. The system of claim 25, wherein the subgroup of the users is determined based on at least one of the following: demographic information, past behavior of the users, and information related to past purchases made by the users.

27. The system of claim 16, wherein the at least one processing device is further programmed to:
   determine, based on the information related to the one or more occurrences of the advertisement and the information related to the purchases made by the users of the wearable camera systems, statistics on the users who viewed the advertisement and did not purchase a product associated with the advertisement.

28. The system of claim 16, wherein the information related to the one or more occurrences of the advertisement includes information derived from image data captured by the wearable camera systems.

29. The system of claim 16, wherein the information related to the purchases made by the users of the wearable camera systems includes information derived from image data captured by the wearable camera systems.

30. The system of claim 16, wherein at least one processing device is further programmed to receive image data captured by the plurality of wearable camera systems.

31. The system of claim 30, wherein at least one processing device is further programmed to analyze the second image data to determine one or more locations at which the one or more products were purchased.

32. The system of claim 16, wherein at least one processing device is further programmed to determine, based on the second image data, an amount of time from when the advertisement was viewed by the user to when the user purchased the one or more products.

33. The system of claim 16, wherein at least one processing device is further programmed to associate demographic information with the users who viewed the advertisement and purchased the one or more products associated with the advertisement.

34. The system of claim 33, wherein the demographic information is received from the wearable camera systems.

35. The system of claim 33, wherein the demographic information is obtained by analyzing the first image data.

36. The system of claim 16, wherein the one or more products include at least one of: food, a service, and a tangible object.

37. A system for analyzing advertisement effectiveness, the system comprising:
   a memory storing executable instructions; and
   at least one processing device programmed to execute the instructions to:
      receive, from a plurality of wearable camera systems, first image data captured by the wearable camera systems an advertisement in environments of users of the wearable camera systems, wherein the first image data includes first image data captured by at least one of the wearable camera systems in response to a hand-related trigger detected by the at least one of the wearable camera systems, the at least one of the wearable camera systems including a wearable image sensor and a processor configured to adjust an aiming direction of the image sensor;
      determine, based on the received first image data, information related to one or more occurrences of the advertisement;
      receive, from the plurality of wearable camera systems, second image data captured by the wearable camera systems;
      determine, based on the received second image data, information related to past purchases made by the users, wherein the information includes the identity of one or more products purchased by the users and purchase information obtained from a purchase receipt received by at least one of the users and detected by the corresponding wearable camera system from the corresponding image data;
      identify a subgroup of the users based on the information related to past purchases made by the users; and
      determine, based on the information related to the one or more occurrences of the advertisement and the information related to past purchases made by the users, statistics on the users who viewed the advertisement.

38. The system of claim 37, wherein the subgroup of the users is determined based on at least one of the following: demographic information and past behavior of the users.

39. The system of claim 37, wherein the at least one processing device is further programmed to:
   identify a subgroup of the users who did not view the advertisement; and
   determine, based on the information related to the one or more occurrences of the advertisement, statistics on the users from the subgroup of the users who did not view the advertisement and purchased one or more products associated with the advertisement.

40. The system of claim 37, wherein the information related to the one or more occurrences of the advertisement includes information derived from the first image data captured by the wearable camera systems.

41. The system of claim 37, wherein at least one processing device is further programmed to determine, based on the second image data, an amount of time from when the advertisement was viewed by the user to when the user purchased one or more products associated with the advertisement.

42. A system for analyzing advertisement effectiveness, the system comprising:
a memory storing executable instructions; and
at least one processing device programmed to execute the instructions to:
receive, from a plurality of wearable camera systems, image data captured by the wearable camera systems;
determine, based on the received first image data, information related to purchases made by the users of the wearable camera systems, wherein:
at least one of the wearable camera systems includes a wearable image sensor and a processor configured to adjust an aiming direction of the image sensor,
the image data includes image data captured by the at least one of the wearable camera systems in response to a hand-related trigger detected by the at least one of the wearable camera systems, and
the information includes the identity of one or more products purchased by the users and purchase information obtained from a purchase receipt received by at least one of the users and detected by the corresponding wearable camera system from the corresponding image data; and
determine, based on the information related to the purchases made by the users of the wearable camera systems, statistics on the users who purchased the one or more products.

43. The system of claim 42, wherein the at least one processing device is further programmed to:
identify a subgroup of the users; and
determine, based on the information related to the purchases made by the users of the wearable camera systems, statistics on the users from the subgroup of the users who purchased the one or more products.

44. The system of claim 43, wherein the subgroup of the users is determined based on at least one of the following: demographic information and past behavior of the users.

45. The system of claim 44, wherein the at least one processing device is further programmed to:
identify a subgroup of the users; and
determine, based on the information related to the purchases made by the users of the wearable camera systems, statistics on the users from the subgroup of the users who did not purchase the one or more products.

46. The system of claim 45, wherein the subgroup of the users is determined based on at least one of the following: demographic information and past behavior of the users.

47. The system of claim 44, wherein the information related to the purchases made by the users of the wearable camera systems includes information derived from the image data captured by the wearable camera systems.

48. The system of claim 44, wherein at least one processing device is further programmed to analyze the image data to determine one or more locations at which the product was purchased.

49. A software product stored on a non-transitory computer readable medium and comprising data and computer implementable instructions for carrying out a method of:
receiving, from a wearable camera system, first image data captured by the wearable camera system in an environment of a user of the wearable camera system in response to a hand-related trigger detected by the wearable camera system, wherein:
the wearable camera system includes a wearable image sensor and a processor configured to adjust an aiming direction of the image sensor;
determine, based on the received first image data, information related to one or more occurrences of an advertisement in the environment of the user of the wearable camera system;
receiving, from the wearable camera system, second image data captured by the wearable camera system;
determine, based on the received second image data, information relating to one or more activities of the user, wherein the information relating to the one or more activities of the user includes a purchase receipt and purchase information relating to the purchase receipt; and
identifying, based on the information related to the one or more occurrences of the advertisement and the information related to the one or more activities of the user, a product acquired by the user that is associated with the advertisement.

50. A software product stored on a non-transitory computer readable medium and comprising data and computer implementable instructions for carrying out a method of:
receiving, from a plurality of wearable camera systems, first image data captured by the wearable camera systems an advertisement in environments of users of the wearable camera systems, wherein the first image data includes first image data captured by at least one of the wearable camera systems in response to a hand-related trigger detected by the at least one of the wearable camera systems, the at least one of the wearable camera systems including a wearable image sensor and a processor configured to adjust an aiming direction of the image sensor;
determining, based on the received first image data, information related to one or more occurrences of the advertisement;
receiving, from the plurality of wearable camera systems, second image data captured by the wearable camera systems;
determining, based on the received second image data, information relating to one or more activities of the users, wherein the information relating to the one or more activities of the users includes a purchase receipt and purchase information relating to the purchase receipt;
identifying, based on the determined information relating to one or more activities of the users, one or more of the users of the plurality of wearable camera systems who purchase done or more products included in the advertisement;
analyzing the determined information relating to one or more activities of the users to identify the one or more products included in the advertisement that were purchased; and
determining, based on the analysis, an effectiveness of the advertisement.

51. A software product stored on a non-transitory computer readable medium and comprising data and computer implementable instructions for carrying out a method of:
receiving, from a plurality of wearable camera systems, first image data captured by the wearable camera systems an advertisement in environments of users of the wearable camera systems, wherein the first image data includes first image data captured by at least one of the wearable camera systems in response to a hand-related trigger detected by the at least one of the wearable camera systems, the at least one of the wearable camera systems including a wearable image sensor and a processor configured to adjust an aiming direction of the image sensor;

determining, based on the received first image data, information related to one or more occurrences of the advertisement;

receiving, from the plurality of wearable camera systems, second image data captured by the wearable camera systems;

determining, based on the second image data, information related to purchases made by the users of the wearable camera systems, wherein the information includes the identity of one or more products purchased by the users and purchase information obtained from a purchase receipt received by at least one of the users and detected by the corresponding wearable camera system from the corresponding image data; and determining, based on the information related to the one or more occurrences of the advertisement and the information related to the purchases made by the users of the wearable camera systems, statistics on the users who viewed the advertisement and purchased one or more products associated with the advertisement.

52. A software product stored on a non-transitory computer readable medium and comprising data and computer implementable instructions for carrying out a method of:

receiving, from a plurality of wearable camera systems, first image data captured by the wearable camera systems an advertisement in environments of users of the wearable camera systems, wherein the first image data includes first image data captured by at least one of the wearable camera systems in response to a hand-related trigger detected by the at least one of the wearable camera systems, the at least one of the wearable camera systems including a wearable image sensor and a processor configured to adjust an aiming direction of the image sensor;

determining, based on the received first image data, information related to one or more occurrences of the advertisement;

receiving, from the plurality of wearable camera systems, second image data captured by the wearable camera systems;

determining, based on the received second image data, information related to past purchases made by the users, wherein the information includes the identity of one or more products purchased by the users and purchase information obtained from a purchase receipt received by at least one of the users and detected by the corresponding wearable camera system from the corresponding image data;

identifying a subgroup of the users based on information related to past purchases made by the users, wherein the information includes the identity of one or more products purchased by the users; and determining, based on the information related to the one or more occurrences of the advertisement and the information related to past purchases made by the users, statistics on the users who viewed the advertisement.

53. A software product stored on a non-transitory computer readable medium and comprising data and computer implementable instructions for carrying out a method of:

receiving, from a plurality of wearable camera systems, image data captured by the wearable camera systems;

determine, based on the received first image data, information related to purchases made by the users of the wearable camera systems, wherein:

at least one of the wearable camera systems includes a wearable image sensor and a processor configured to adjust an aiming direction of the image sensor, the image data includes image data captured by the at least one of the wearable camera systems in response to a hand-related trigger detected by the at least one of the wearable camera systems, and the information includes the identity of one or more products purchased by the users and purchase information obtained from a purchase receipt received by at least one of the users and detected by the corresponding wearable camera system from the corresponding image data; and determining, based on the information related to the purchases made by the users of the wearable camera systems, statistics on the users who purchased the one or more products.

* * * * *